United States Patent Office 3,468,924
Patented Sept. 23, 1969

3,468,924
α,α-DIFLUOROALKYLARYLMETHYL
ISOCYANATES
David M. Gale, Wilmington, Del., assignor to E. I. du
Pont de Nemours and Company, Wilmington, Del., a
corporation of Delaware
No Drawing. Filed Apr. 21, 1966, Ser. No. 544,096
Int. Cl. C07c *119/04;* B32b *23/00;* C08j *1/38*
U.S. Cl. 260—453       3 Claims

---

ABSTRACT OF THE DISCLOSURE (1) Aralkyl isocyanates of the formula

wherein $Y^1$ and $Y^2$ are fluorine, chlorine or 1–6 carbon perfluoroalkyl, ω-chloroperfluoroalkyl or ω-hydroperfluoroalkyl radicals, $n$ is the integer 1 or 2 and Q is a radical formed by removal of $n$ hydrogen atoms from a compound HQH selected from the group benzene, naphthalene, anthracene, biphenyl and polycyclic compounds containing 2 six-membered carbocyclic aromatic rings which are joined through a bridge selected from the group —O—, —S— and $-(CH_2)_m$-, $m$ being an integer from 1–6; and (2) the process of preparing the aralkyl isocyanates of this invention through reaction of the corresponding amine with oxalyl chloride or phosgene.

The compounds of this invention are useful as laundry-fast water-repellent finishes for cellulosic fabrics and as intermediates in the formation of polymeric materials.

---

FIELD OF THE INVENTION

This invention relates to novel isocyanates and to the process for their preparation.

DETAILS OF THE INVENTION

The compounds of this invention are the class of aralkyl isocyanates having the formula

wherein $Y^1$ and $Y^2$ are fluorine, chlorine or 1–6 carbon perfluoroalkyl, ω-chloroperfluoroalkyl or ω-hydroperfluoroalkyl radicals, $n$ is an integer from 1–2, and Q is a radical formed by removal of $n$ hydrogen atoms from a compound HQH selected from the group benzene, naphthalene, anthracene, biphenyl and polycyclic compounds containing 2 six-membered carbocyclic aromatic rings which are joined through a bridge selected from the group —O—, —S— and $-(CH_2)_m$- and $m$ is an integer from 1–6.

The compounds of this invention are prepared by reacting α,α-bis(polyfluoroalkyl)aralkyl amines of the formula

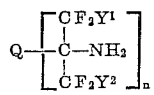

with oxalyl chloride or phosgene, these reactants being hereinafter referred to as "the phosgenating agent." The symbols Q, $Y^1$ and $Y^2$ have the same definitions as provided above. The reaction is carried out under essentially anhydrous conditions. Catalysts such as tertiary amines can be used. It is desirable to use at least one mole of phosgenating agent per amino group of the aralkyl amine and preferably an excess thereof, that is, up to 10 moles per amino group is employed. The aralkyl amine reactant is generally added to the phosgenating agent to minimize side reactions. The reaction can be carried out in the absence of solvent or diluent or an excess of oxalyl chloride when the latter is used as the phosgenating agent, can serve as the reaction solvent. Diluents which can be used are those which are inert in the reaction mixture, for example, acyclic or cyclic ethers such as diethyl ether, di-n-butyl ether, 1,2-dimethoxyethane, dioxane and tetrahydrofuran; aromatic hydrocarbons or halohydrocarbons, for example, benzene, toluene, xylenes, and chlorobenzene; nitriles, for example, acetonitrile and benzonitrile; and other solvents.

The reaction proceeds at temperatures as low as 0° C. The preferred reaction temperature is 50–75° C. Temperatures of up to 100–150° C. can be used. The reaction can be conducted at atmospheric pressures under a reflux condenser, however it can be conducted at sub-atmospheric or super-atmospheric pressure. The reaction can be conducted in the vapor phase. The reaction product is isolated by conventional synthetic organic methods such as distillation at atmospheric or reduced pressure or by crystallization.

α,α-Bis(polyfluoroalkyl)aralkyl amines employed herein as reactants are prepared by a method disclosed and claimed in my co-assigned patent application, Ser. No. 517,830, filed Dec. 30, 1965. This process involves the reaction of a polyfluoroalkylidenimine with an aromatic compound HQH, as defined above. In general, the reaction between the HQH compound and the alkylidenimine is carried out in the presence of a Friedel-Crafts catalyst such as aluminum chloride, boron trifluoride and the like. The reaction between the HQH compound and the polyfluoroalkylidenimine can be effected in the presence or absence of an organic liquid reaction medium which is unreactive with the reactants and reaction product under the conditions of reaction.

The polyfluoroalkylidenimine employed in the preparation of α,α-bis(polyfluoroalkyl)aralkyl amine reactants are obtained by reacting a polyfluoroketone with at least one molar equivalent of ammonia at a temperature of −50° to 10° C., followed by dehydration of the resulting aminohydroxypolyfluoroalkane with a dehydrating agent in the presence of an acid acceptor and then distilling to recover the imine. The imine reactant also can be prepared by reacting hydrazoic acid with a polyfluorothioketone. Both of the aforesaid preparatory methods for the polyfluoroalkylidenimine reactants are disclosed and claimed in U.S. Patent 3,226,439, issued Dec. 28, 1965 to William J. Middleton.

Preparation of some of the above reactants is further illustrated by Examples A and B.

Example A.—α,α-Bis(trifluoromethyl)benzylamine

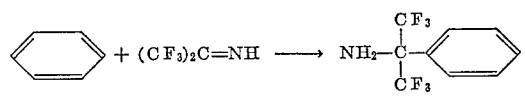

α,α-Bis(trifluoromethyl)benzylamine, 4.6 g., B.P. 95° C. (60 mm.), was prepared by heating 25 g. of benzene, 25 g. of hexafluoroisopropylidenimine and 4.0 g. of aluminum chloride in an autoclave at 200° C. for 8 hours. The product was isolated by mixing the reaction mixture (after venting) with ether, filtering to remove undissolved salts and distilling the ether filtrate.

*Analysis.*—Calcd. for $C_9H_7NF_6$: C, 44.46; H, 2.90; N, 5.76; F, 46.89. Found: C, 44.75; H, 2.72; N, 5.54; F, 46.54.

Example B.—4,4'-oxybis[α,α-bis(trifluoromethyl)benzylamine]

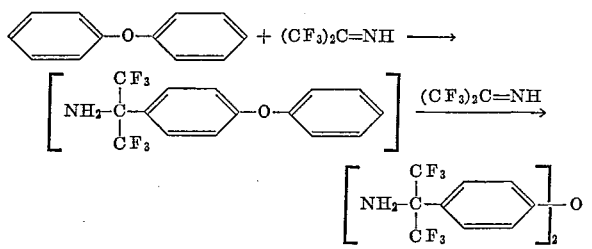

A 17-gram sample of diphenyl ether, 3.2 g. of aluminum chloride and 40 g. of hexafluoroisopropylidenimine were heated at 150° C. for 8 hours. The semi-solid recovered from the autoclave (53 g.) was treated with 300 ml. of ether and filtered to remove solids. Evaporation of the ether from the filtrate gave 50 g. of residue, 22 g. of which was distilled through a short column to give 17.2 g. of product, B.P. ca. 149–162° C. (1 mm.). This material was redistilled through a spinning-band column and gave 8.0 g. of 4,4'-oxybis[α,α-bis(trifluoromethyl)benzylamine], B.P. 124° C. (0.2 mm.), M.P. 50–52° C.

Analysis.—Calcd. for $C_{18}H_{12}ON_2F_{12}$: C, 43.21; H, 2.42 N, 5.60. Found: C, 43.46; H, 2.48; N, 5.60.

EMBODIMENTS OF THE INVENTION

The following examples illustrate the invention.

Example 1.—α,α-Bis(trifluoromethyl)benzyl isocyanate

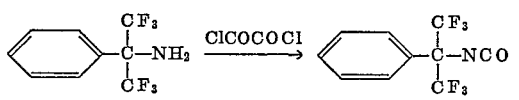

To a stirred solution of 10.7 g. (0.084 mole) of oxalyl chloride in 20 ml. of tetrahydrofuran heated at 55–65° C. was added dropwise over 15 minutes 12 g. (0.05 mole) of α,α-bis(trifluoromethyl)benzylamine. The yellow solution was refluxed for 45 minutes and the excess oxalyl chloride and solvent was removed at atmospheric pressure over 4 hours. The residue was distilled through a spinning-band column. The distillate, 1.7 g. (14% yield), $n_D^{25}$ 1.4192, B.P. 56° C. (10 mm.), showed a strong isocyanate band at 2310 cm.$^{-1}$ (4.41μ). A considerable amount of white solid residue was left in the pot. The $F^{19}$ n.m.r. spectrum of α,α-bis(trifluoromethyl)benzyl isocyanate showed a triplet (J=0.75) at +4149 c.p.s. from external $FCCl_3$ at 56.4 mc. which corresponds to the two ortho-hydrogens splitting the fluorine atoms. The $H^1$ n.m.r. spectrum showed ortho-hydrogens at τ2.4 and para- and meta-hydrogens at τ2.6. The ultraviolet spectrum showed $\lambda_{max}^{acetonitrile}$ 266 (ε=372), 260 (ε=471), 254 (ε=358) and 250 mμ (ε=229). The mass spectrum showed a parent ion at m/e 269 and a base peak at m/e 200 (parent —$CF_3$).

Analysis.—Calcd. for $C_{10}H_5NOF_6$: C, 44.63; H, 1.89; F, 42.36. Found: C, 44.55; H, 2.01; F, 41.99.

Example 2.—4,4'-oxybis[α,α-bis(trifluoromethyl)benzyl isocyanate]

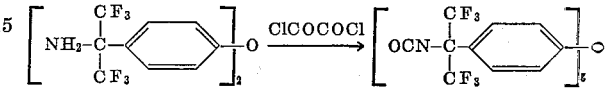

In a 3-necked flask set up as the pot of a spinning-band column, 12 g. (0.024 mole) of 4,4'-oxybis[α,α-bis(trifluoromethyl)benzylamine] dissolved in 30 ml. of tetrahydrofuran was added at 55–65° C. over 0.5 hour with stirring to 30 ml. (0.35 mole) of oxalyl chloride in 50 ml. of tetrahydrofuran. After refluxing for 1 hour, the solvent and excess oxalyl chloride was removed by distillation over 4 hours at atmospheric pressure and the residue was vacuum distilled. The product, B.P. 140–145° C. (1.5 mm.), 8.1 g. (65% yield), showed a strong band in the isocyanate region of its infrared spectrum (4.41μ). The ultraviolet spectrum showed $\lambda_{max}^{acetonitrile}$ 276 (ε=1050), 269 (ε=1450) and 234 mμ (ε=16,600). The $F^{19}$ n.m.r. spectrum showed a triplet (J=0.75) at +4152 c.p.s. from external $FCCl_3$ at 56.4 mc. The $H^1$ n.m.r. showed an $A_2B_2$ pattern at τ2.25, 2.92 (J=9) and the presence of a small amount of tetrahydrofuran-derived reaction products was also indicated. The mass spectrum showed a parent ion at m/e 532.

Analysis.—Calcd. for $C_{20}H_8N_2O_3F_{12}$: N, 5.08; F, 41.3. Found: N, 5.40; F, 41.21.

This procedure is applicable to the reaction of oxalyl chloride or phosgene with any α,α-di(fluoroalkyl)benzylamine, as previously defined, containing from 1–3 aryl nuclei in the molecule. In the table below are listed, by formulae, other examples of α,α-di(fluoroalkyl)benzyl isocyanates (right-hand column) that can be obtained following the procedure of Example 2 from α,α-di(fluoroalkyl)benzylamines shown, by formula, in the left-hand column.

TABLE

| Example No. | α,α-Di(fluoroalkyl)benzylamine | α,α-Di(fluoroalkyl)benzyl isocyanate |
|---|---|---|
| 3 | NH₂—C(CF₂CF₂H)((CF₂)₃CF₂H)—C₆H₅ | OCN—C(CF₂CF₂H)((CF₂)₃CF₂H)—C₆H₅ |
| 4 | NH₂—C((CF₂)₆CF₃)((CF₂)₆CF₃)—C₆H₅ | OCN—C((CF₂)₆CF₃)((CF₂)₆CF₃)—C₆H₅ |
| 5 | NH₂—C((CF₂)₆CF₂Cl)((CF₂)₆CF₂Cl)—C₆H₅ | OCN—C((CF₂)₆CF₂Cl)((CF₂)₆CF₂Cl)—C₆H₅ |
| 6 | naphthyl—C(CF₂CF₂H)(CF₂CF₂H)—NH₂ | naphthyl—C(CF₂CF₂H)(CF₂CF₂H)—NCO |

| Example No. | α,α-Di(fluoroalkyl)benzylamine | α,α-Di(fluoroalkyl)benzyl isocyanate |
|---|---|---|
| 7–15 | 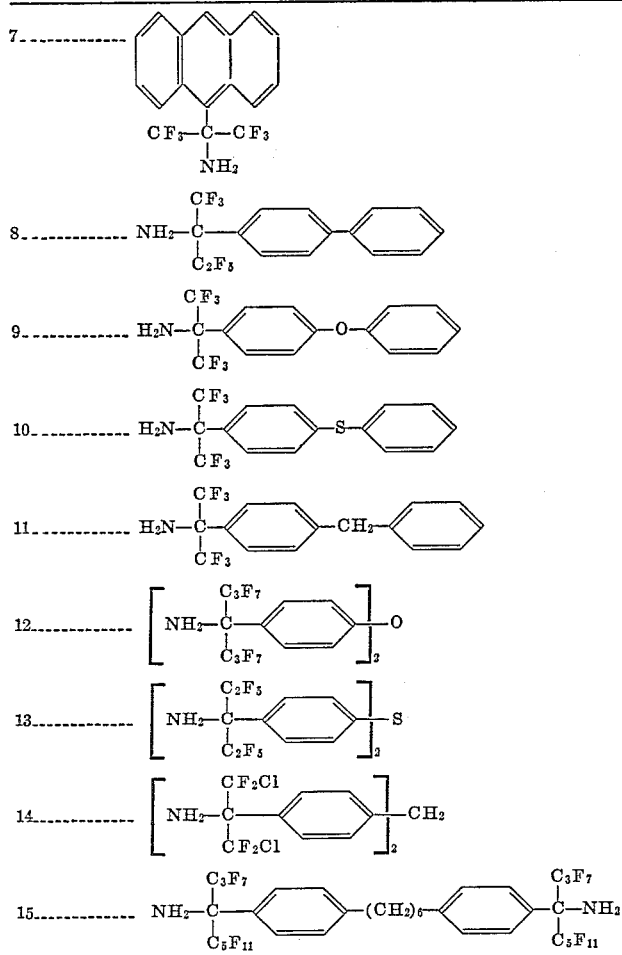 | 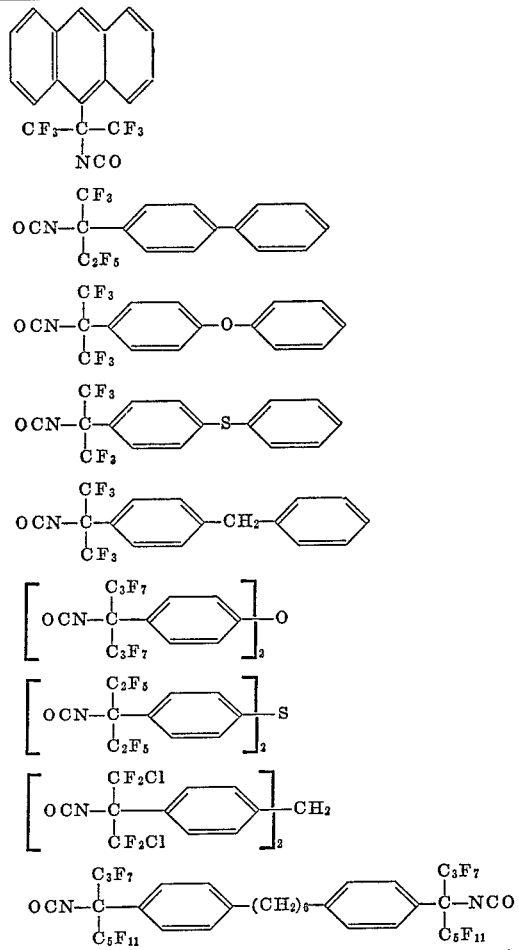 |

The mono- and diisocyanates of this invention are useful as laundry-fast water-repellent finishes for cellulosic fabrics such as paper, cotton, regenerated cellulose, partly esterified or etherified cellulose, and the like.

The diisocyanates are useful as intermediates in the preparation of polymeric materials by reaction with polyfunctional compounds and polymers containing —OH, >NH and —COOH substituents, for example, in the preparation of polyurethanes or polyureas from glycols and diamines, respectively. Such polymers can be used to form shaped articles such as films or fibers, or in other applications of polymeric products, that is, as coating, impregnating or adhesive resins.

The following examples further illustrate the utility of the products of the invention.

Example C.—Polymer from 4,4-oxybis[α,α-bis(trifluoromethyl)benzyl isocyanate] and ethylene glycol

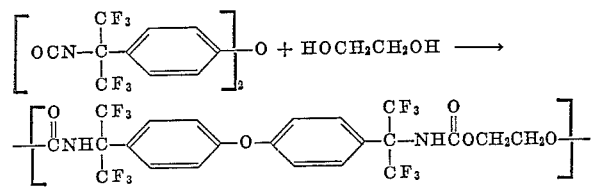

Exactly 4.998 g. (9.04 mmole) of 4,4-oxybis[α,α-bis-(trifluoromethyl)benzylamine], 0.561 g. (9.04 mmole) of ethylene glycol (as 4.35 g. of a 12.9% wt./wt. solution in diglyme), and 2 ml. of diglyme were sealed in a polymer tube and heated for two weeks in a steam bath and for 3 hours at 150° C. The contents of the tube were poured into water contained in a high speed blender. The white solid obtained was washed with water and dried (about 5 g.). Clear films of the polymer could be made by compression molding. Clear films of the polymer could be cast from N,N-dimethylformamide solutions.

*Analysis.*—Calcd. for $(C_{22}H_{14}N_2O_5F_{12})_n$: C, 43.01; H, 2.29; N, 4.56. Found: C, 43.12; H, 2.86; N, 4.10.

Example D.—Water-proofing of paper

A sample of

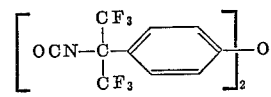

warmed almost to boiling was poured onto a piece of dry filter paper (from which water had been removed in a warm air stream). The treated filter paper was not "wetted" by a drop of water, while untreated paper was "wetted" immediately by water. The water-proofing properties of the treated paper were not destroyed by an acetone rinse.

A similar water-proofing effect can be obtained when α,α-bis(trifluoromethyl)benzyl isocyanate is used in the same test.

Water-repellent finishes can also be prepared by first impregnating the cellulosic material, e.g., a cotton fabric, with a minor amount, of the order of 1–5% by weight, of a polymeric polyamine such as that obtained by reductive amination of an ethylene/carbon monoxide polymer, then treating the impregnated fabric with one of the mono- or diisocyanates of this invention, applied either as such or as a solution in an organic solvent.

The foregoing detailed description has been given for clarity of understanding only and no unnecessary limitations are to be understood therefrom. The invention is not limited to the exact details shown and described for obvious modifications will be apparent to those skilled in the art.

The embodiments of the invention in which an exclusive property or prvilege is claimed are defined as follows:

1. The class of aralkyl isocyanates having the formula

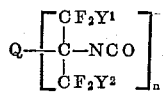

wherein $Y^1$ and $Y^2$ are fluorine, chlorine or 1–6 carbon perfluoroalkyl, ω-chloroperfluoroalkyl or ω-hydroperfluoroalkyl radicals, $n$ is the integer 1 or 2 and Q is a radical formed by removal of $n$ hydrogen atoms from a compound HQH selected from the group benzene, naphthalene, anthracene, biphenyl and polycyclic compounds containing 2 six-membered carbocyclic aromatic rings which are joined through a bridge selected from the group —O—, —S— and $(CH_2)_m$, $m$ being an integer from 1–6.

2. α,α-bis(trifluoromethyl)benzyl isocyanate.

3. 4,4′ - oxybis[α,α-bis(trifluoromethyl)benzyl isocyanate].

References Cited
UNITED STATES PATENTS

| | | | |
|---|---|---|---|
| 2,261,156 | 11/1941 | Hentrich et al. | 260—453 |
| 2,625,561 | 1/1953 | Werntz | 260—453 |
| 3,118,923 | 1/1964 | Fawcett | 260—453 |
| 3,226,439 | 12/1965 | Middleton | 260—566 |

FOREIGN PATENTS

| | | |
|---|---|---|
| 955,898 | 4/1964 | Great Britain. |

CHARLES B. PARKER, Primary Examiner

DOLPH T. TORRENCE, Assistant Examiner

U.S. Cl. X.R.

8—115.6, 116.2, 129; 106—168, 190; 117—139.5, 144, 154, 161; 260—75, 77.5, 566, 570.5